(12) United States Patent
Ala-Rantala

(10) Patent No.: US 7,908,569 B2
(45) Date of Patent: Mar. 15, 2011

(54) CREATING VIRTUAL TARGETS IN DIRECTORY STRUCTURES

(75) Inventor: Kati Ala-Rantala, Tampere (FI)

(73) Assignee: Nokia Corporation, Espoo (FI)

(*) Notice: Subject to any disclaimer, the term of this patent is extended or adjusted under 35 U.S.C. 154(b) by 288 days.

(21) Appl. No.: 11/503,559

(22) Filed: Aug. 10, 2006

(65) Prior Publication Data

US 2008/0040668 A1  Feb. 14, 2008

(51) Int. Cl.
*G06F 3/048* (2006.01)
(52) U.S. Cl. ......... 715/853; 715/769; 715/770; 715/854
(58) Field of Classification Search .................... 715/853
See application file for complete search history.

(56) References Cited

U.S. PATENT DOCUMENTS

| | | | |
|---|---|---|---|
| 2004/0070622 A1 | 4/2004 | Cossey et al. | 345/769 |
| 2005/0059288 A1 | 3/2005 | Lin et al. | 439/342 |
| 2005/0198153 A1 | 9/2005 | Keohane et al. | 709/206 |

OTHER PUBLICATIONS

Paul McFedries, "Complete Idiot's Guide to Windows XP," Alpha Books, Chapter 6.2.*
Microsoft User Experience, Official Guidelines for User Interface Developers and Designers, Microsoft Press, 1999, p. 81; p. 101-p. 102; p. 178-p. 179; p. 274-p. 276; p. 469-p. 470; p. 472-473, figures 7, 8.

* cited by examiner

*Primary Examiner* — William L Bashore
*Assistant Examiner* — Daniel Um
(74) *Attorney, Agent, or Firm* — Harrington & Smith

(57) ABSTRACT

A method includes detecting a first user operation corresponding to a first item in a directory structure. The directory structure represents a hierarchical arrangement of a plurality of items, including the first item, in a memory. The first user operation indicates a start of an item action with the first item. The method also includes, in response to detecting a second user operation corresponding to a second item in the directory structure, creating a virtual target in the second item in the directory structure. The virtual target is a possible location for completion of the item action with the first item. The method further includes, in response to a third user operation indicating completion of the item action with the first item in the virtual target, completing the item action with the first item in the virtual target.

37 Claims, 18 Drawing Sheets

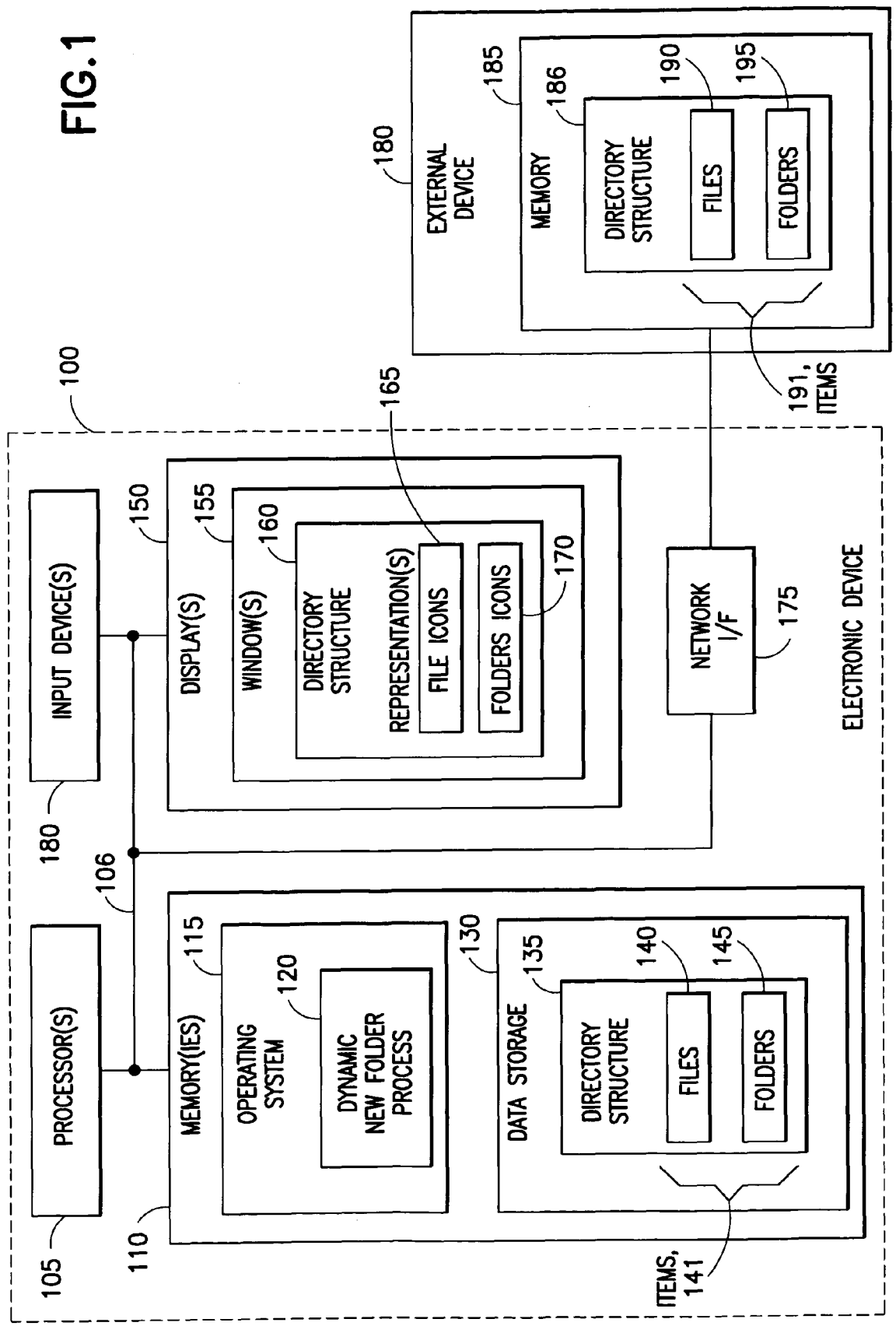

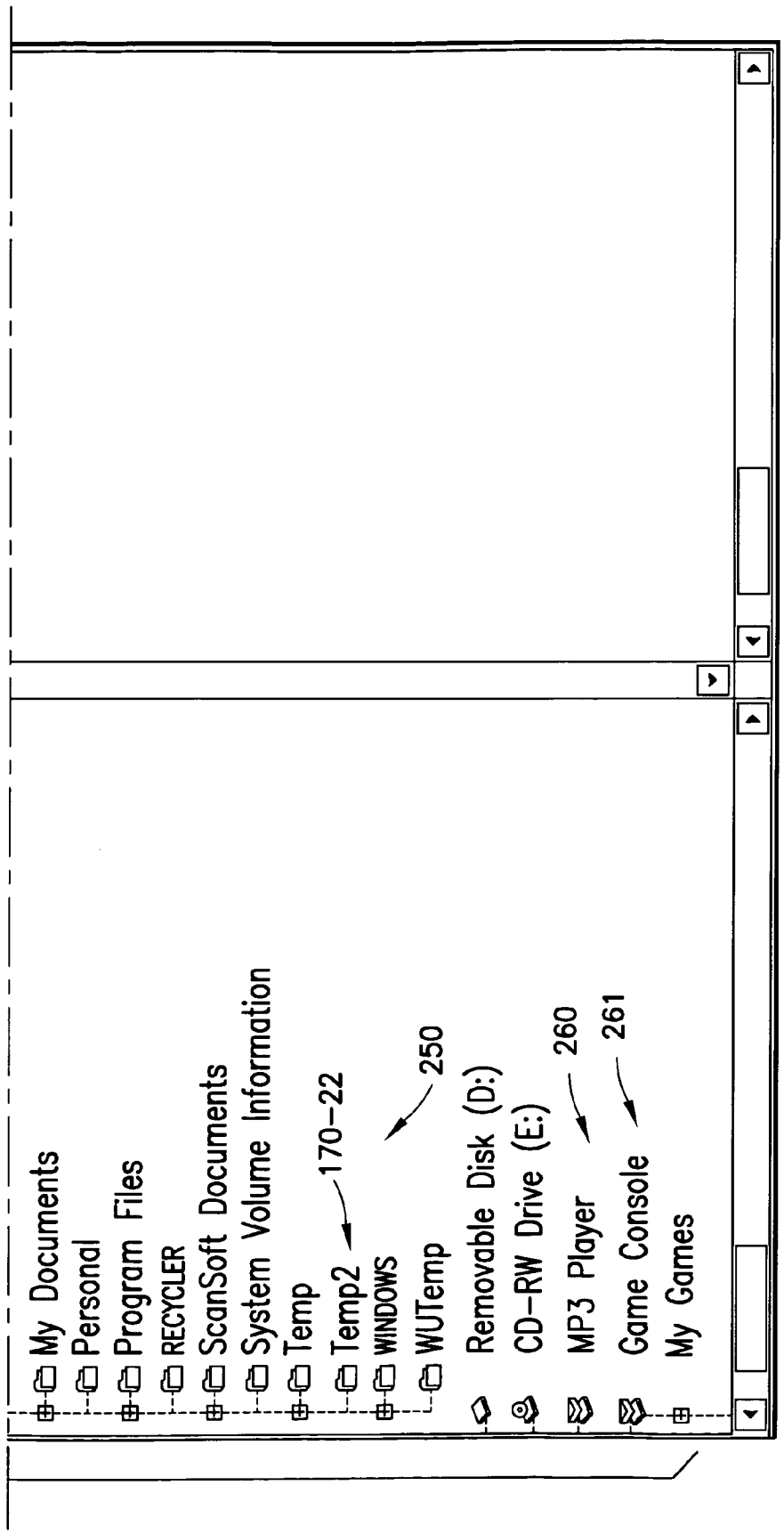

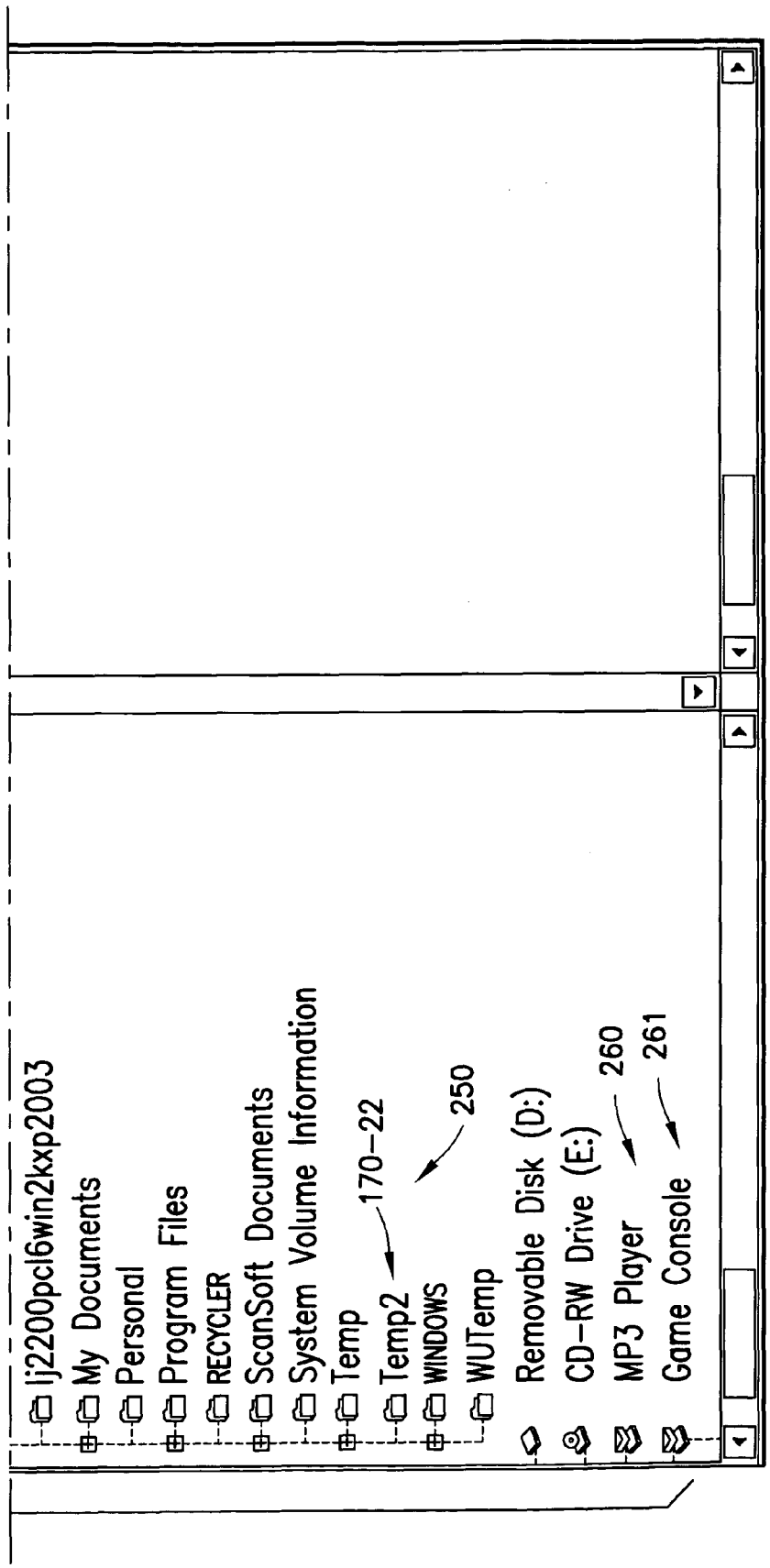

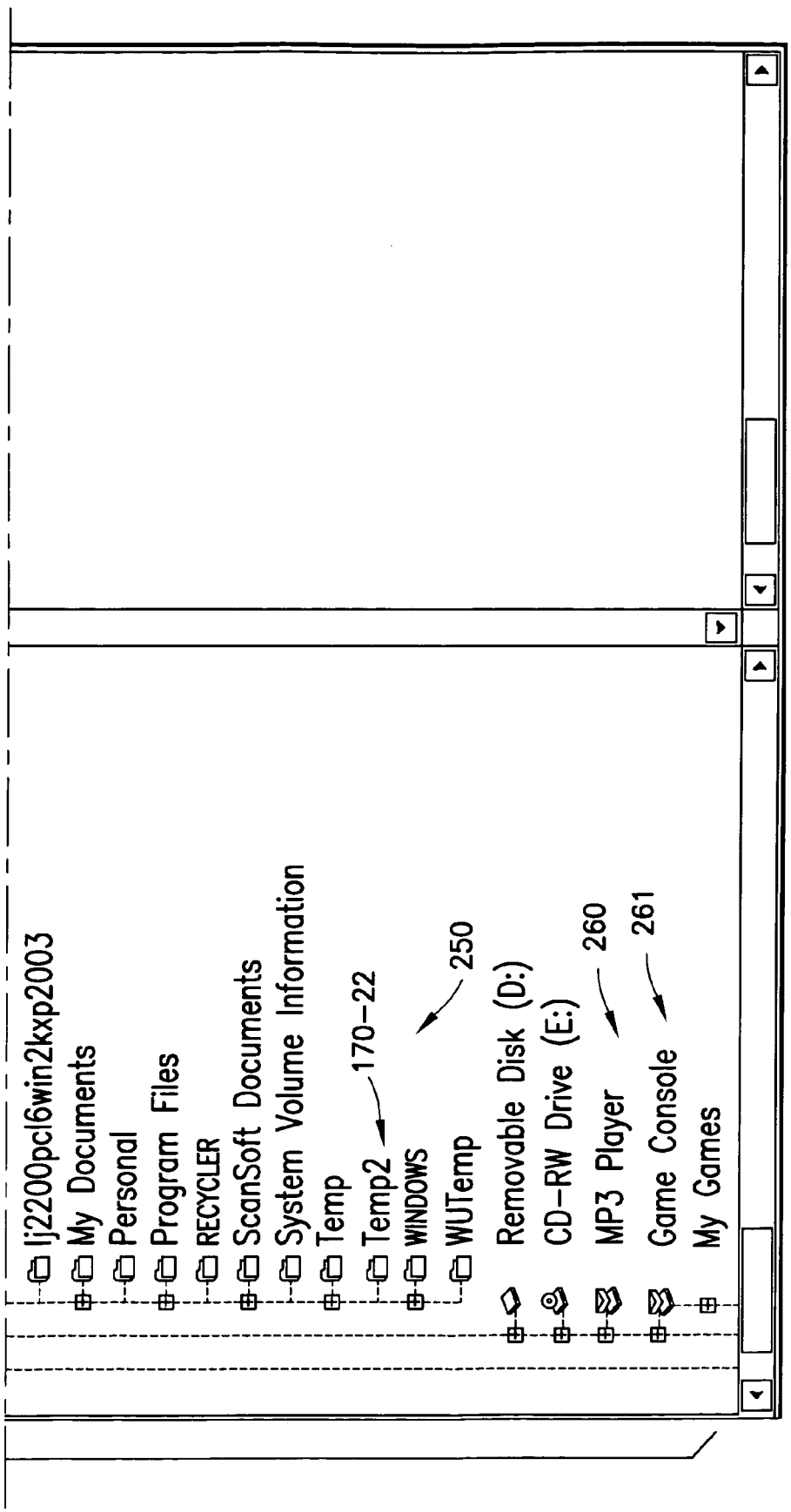

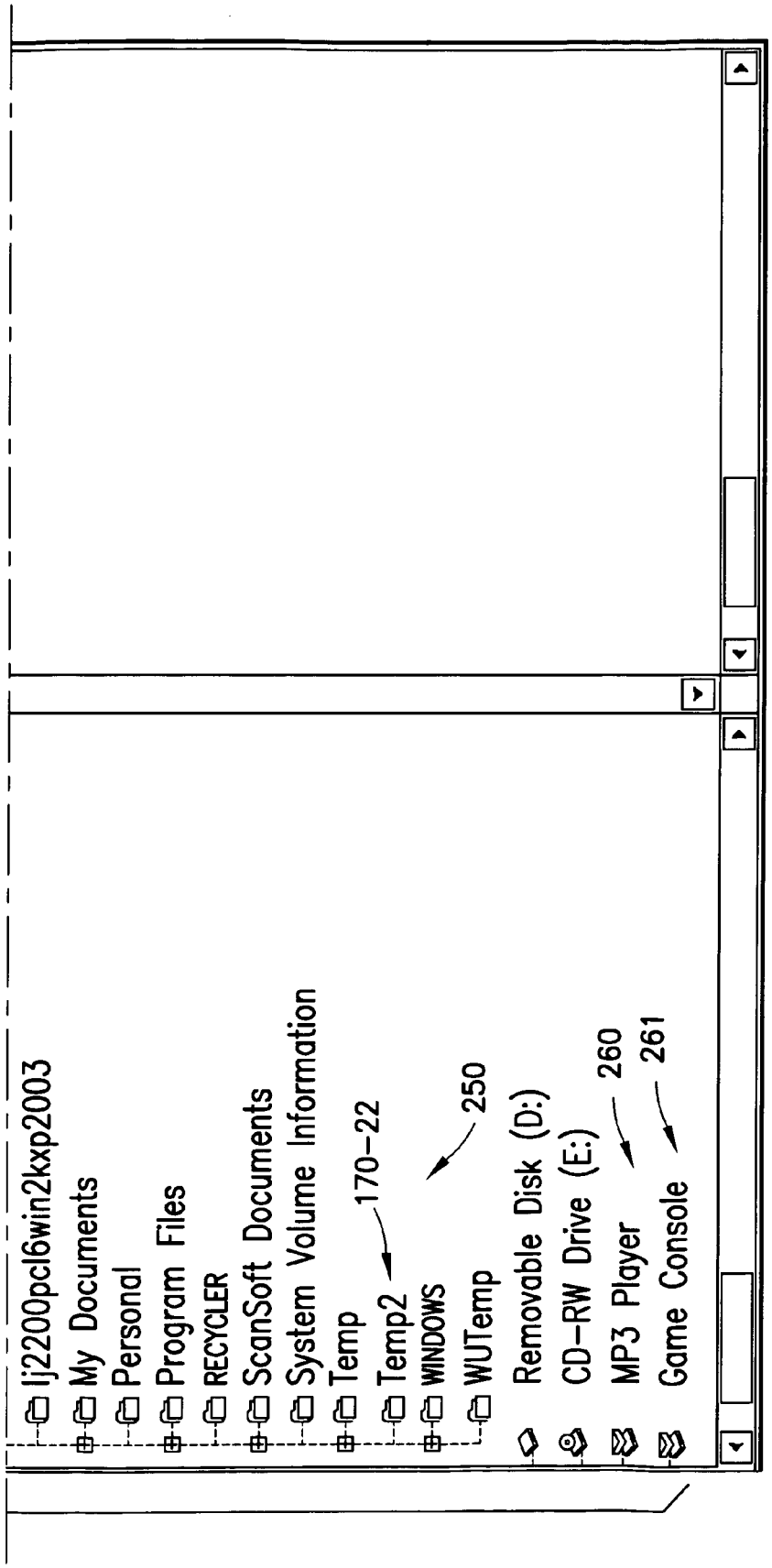

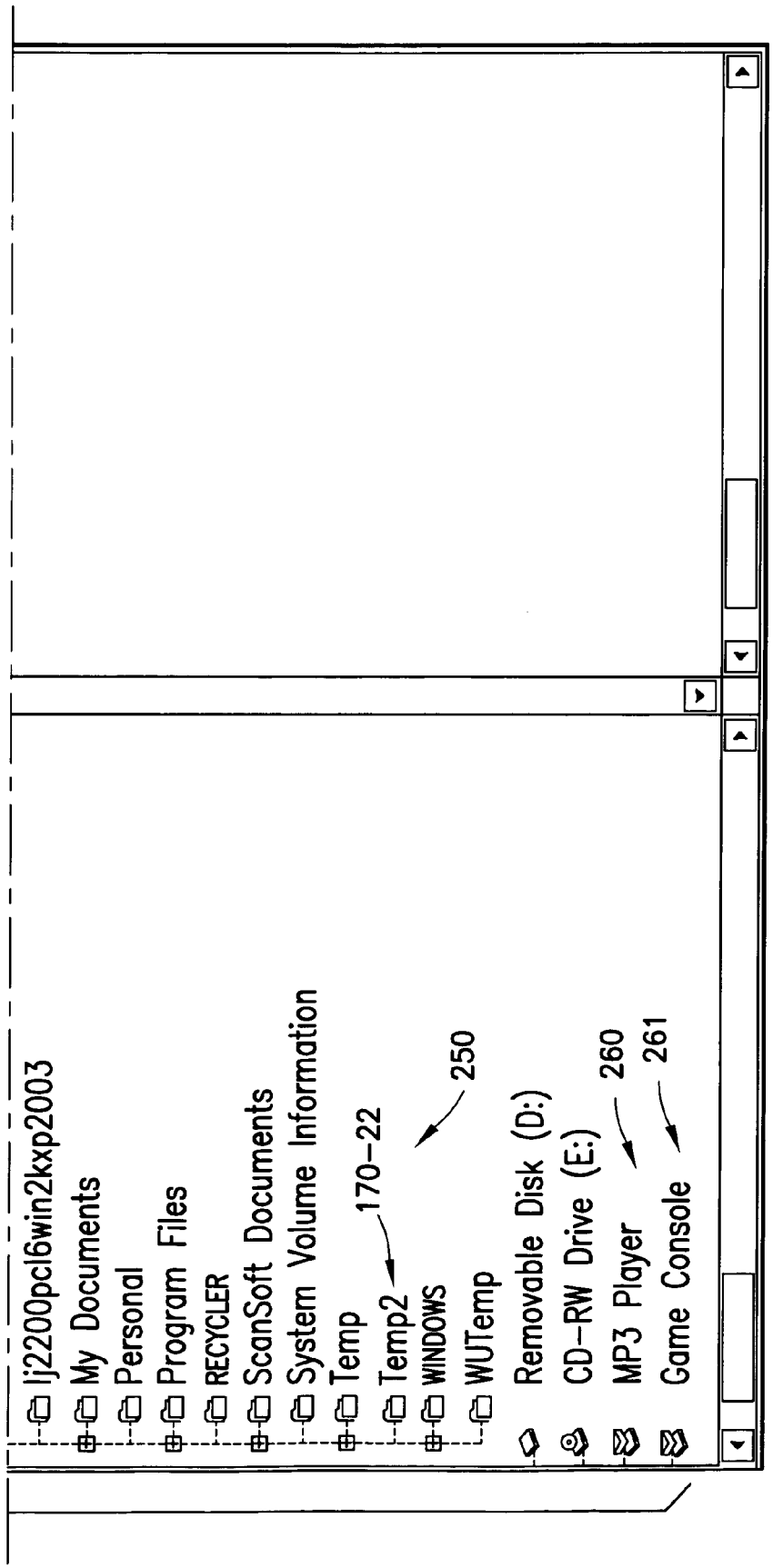

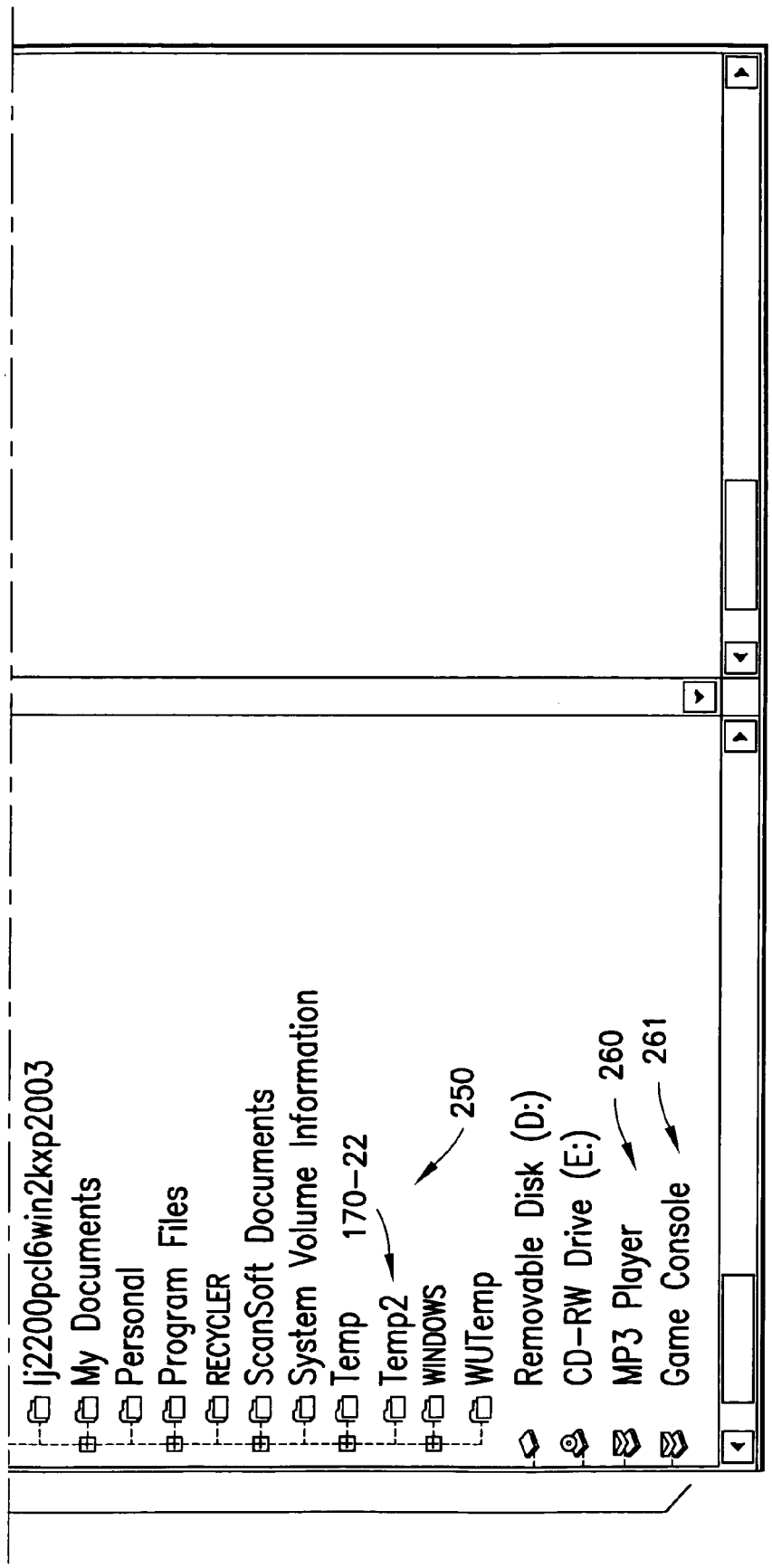

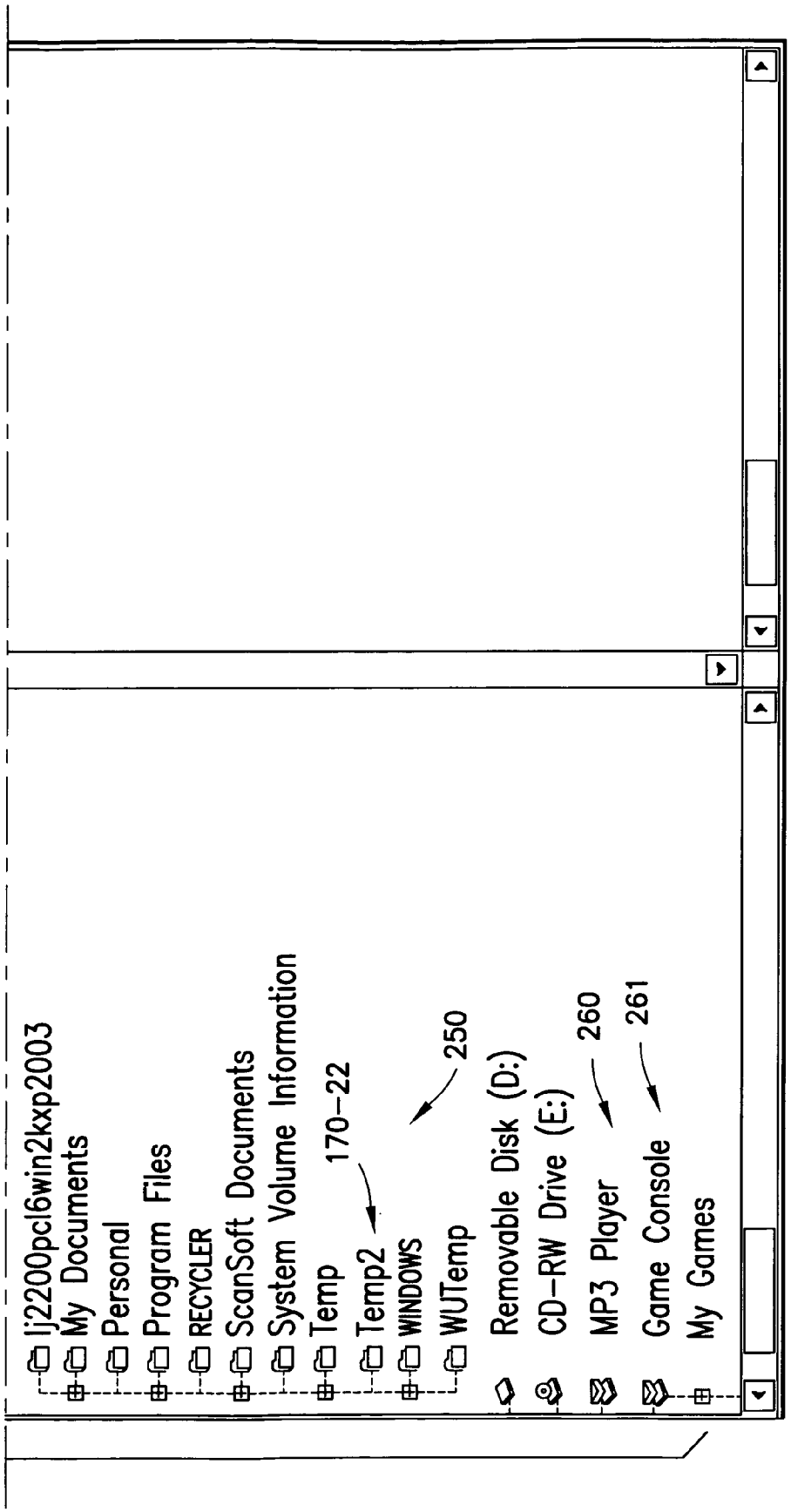

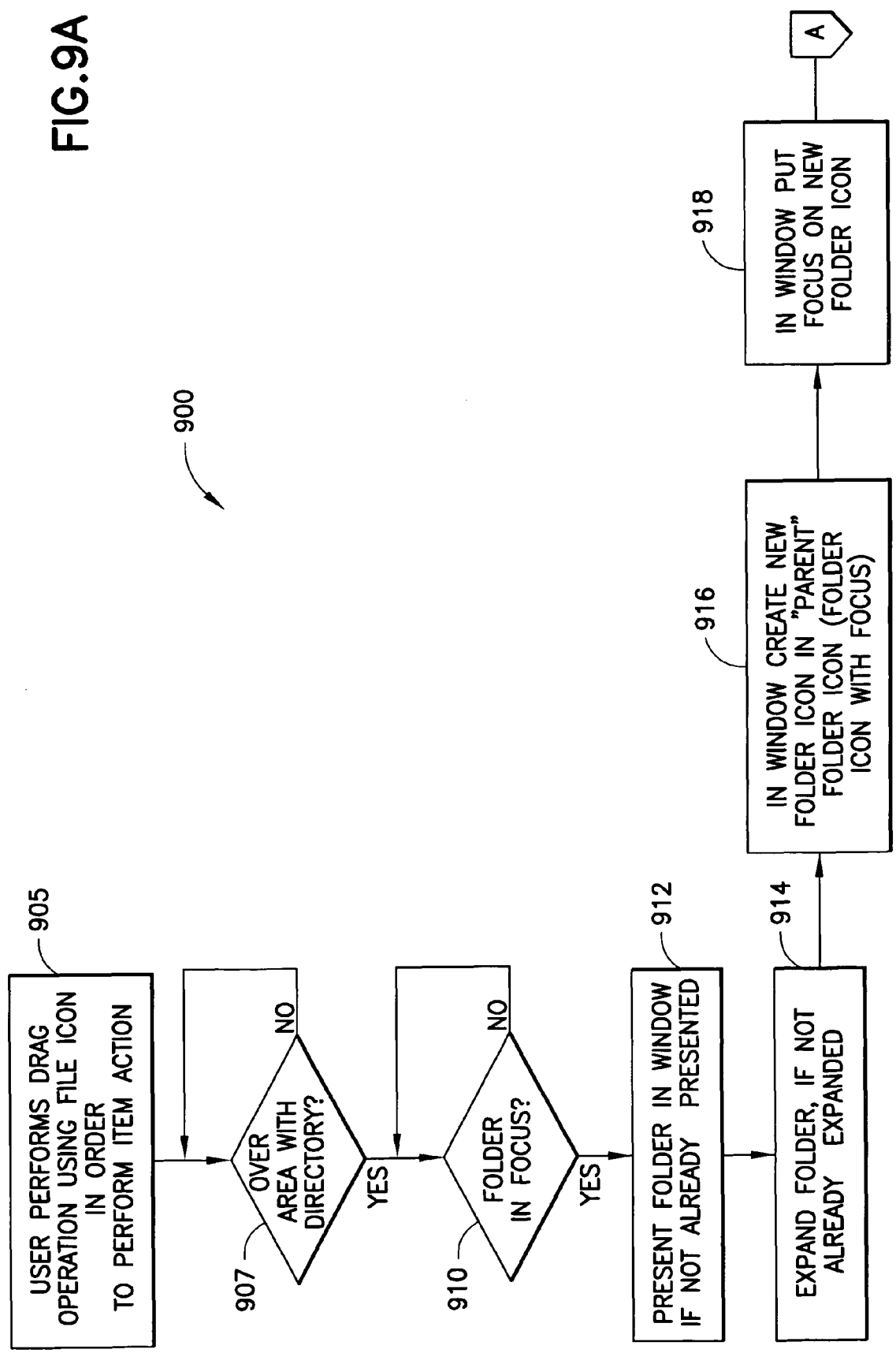

CREATING VIRTUAL TARGETS IN DIRECTORY STRUCTURES

TECHNICAL FIELD

This invention relates generally to computer systems and, more specifically, relates to performing actions with items on computer systems.

BACKGROUND

On electronic devices such as computers, cameras, game consoles and cellular phones, files are stored in some type of data storage in memory. Typically, the data storage is a hard drive, but could be other storage such as non-volatile memory. The data storage is organized through a directory structure. The directory structure organization includes a "root" directory and subdirectories. Each subdirectory may include additional subdirectories. Each directory may contain zero or more files. An operating system allows a user access to the directory structure. For instance, the operating system allows a user to view, create, modify, and delete files and folders in the directory structure.

Early operating systems where text-based. However, many current operating systems use "windows" in order to provide a visual interface to the user. In electronic devices using such operating systems, directories are represented by icons of folders and such directories are called "folders". For simplicity, the term "folder" will be used herein, even when text-based operating systems are described. The folders and files are items presented to a user in a directory structure representation, which is a representation of the folders and files on the directory structure in the memory.

Many times, a user desires to perform a file action (e.g., copy, move) with a file or folder. For instance, the user may desire to copy a file from one folder to another folder. Current operating systems have made such file actions easier. As an example, to copy a file, a user can select, using a pointer for example, a file icon that corresponds to the file. The user can then perform a drag operation with the file icon. The drag operation is usually performed by holding down a button of a mouse while a facsimile of the file icon is moved in a window or between windows. The user will place focus on a folder to which the file is to be copied. The user then performs a drop operation, typically by releasing the button of the mouse. The drop operation corresponding to the folder with focus causes the file action to be performed using the file. In the case of a copy file action, the file corresponding to the file icon is then copied from its original folder to the folder with focus. This process is visual and simple.

Although current operating systems have made it easier to perform file actions with a file, there are still problems associated with performing file actions with files.

BRIEF SUMMARY

In an exemplary embodiment of the invention, a method includes detecting a first user operation corresponding to a first item in a directory structure. The directory structure represents a hierarchical arrangement of a plurality of items, including the first item, in a memory. The first user operation indicates a start of an item action with the first item. The method also includes, in response to detecting a second user operation corresponding to a second item in the directory structure, creating a virtual target in the second item in the directory structure. The virtual target is a possible location for completion of the item action with the first item. The method further includes, in response to a third user operation indicating completion of the item action with the first item in the virtual target, completing the item action with the first item in the virtual target.

Another exemplary embodiment includes a computer-readable medium tangibly embodying a program of computer-readable instructions executable by at least one processor to perform operations. The operations include detecting a first user operation corresponding to a first item in a directory structure. The directory structure represents a hierarchical arrangement of a plurality of items, including the first item, in a memory. The first user operation indicates a start of an item action with the first item. The operations also include, in response to detecting a second user operation corresponding to a second item in the directory structure, creating a virtual target in the second item in the directory structure. The virtual target is a possible location for completion of the item action with the first item. The operations further include, in response to a third user operation indicating completion of the item action with the first item in the virtual target, completing the item action with the first item in the virtual target.

In another exemplary embodiment, an electronic device is disclosed that comprises a processor coupled to a memory including a directory structure comprising a hierarchical arrangement of a plurality of items. The processor is configured to detect a first user operation corresponding to a first of the plurality of items. The first user operation indicates a start of an item action with the first item. The processor is further configured, in response to detecting a second user operation corresponding to a second item in the directory structure, to create a virtual target in the second item in the directory structure. The virtual target is a possible location for completion of the item action with the first item. The processor is further configured, in response to a third user operation indicating completion of the item action with the first item in the virtual target, to complete the item action with the first item in the virtual target.

In another exemplary embodiment, a user interface is disclosed that comprises at least one display, at least one input device configured to allow input of user operations, and a process coupled to the at least one display and the at least one input device. The process is configured to detect a first user operation corresponding to a representation on the at least one display of a first item in a directory structure. The directory structure represents a hierarchical arrangement of a plurality of items, including the first item, in a memory. The first user operation indicates a start of an item action with the first item. The process is responsive to detecting a second user operation corresponding to a representation on the at least one display of a second item in the directory structure in order to create a representation on the at least one display of a virtual target and to associate the representation of the virtual target with the representation of the second item. The virtual target is a possible location for completion of the item action with the first item. The process is also responsive to a third user operation indicating completion of the item action with the first item in the virtual target in order to complete the item action with the first item in the virtual target in the second item.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 1 is a block diagram of an exemplary electronic device suitable for use with embodiments of the disclosed invention and operating in one example with an external device;

FIGS. 9A and 9B, collectively FIG. 9, are figures of a flowchart of an exemplary method for creating dynamic new folders in response to drag and drop operations corresponding to a file;

DETAILED DESCRIPTION OF EXEMPLARY EMBODIMENTS

Figure 2A:
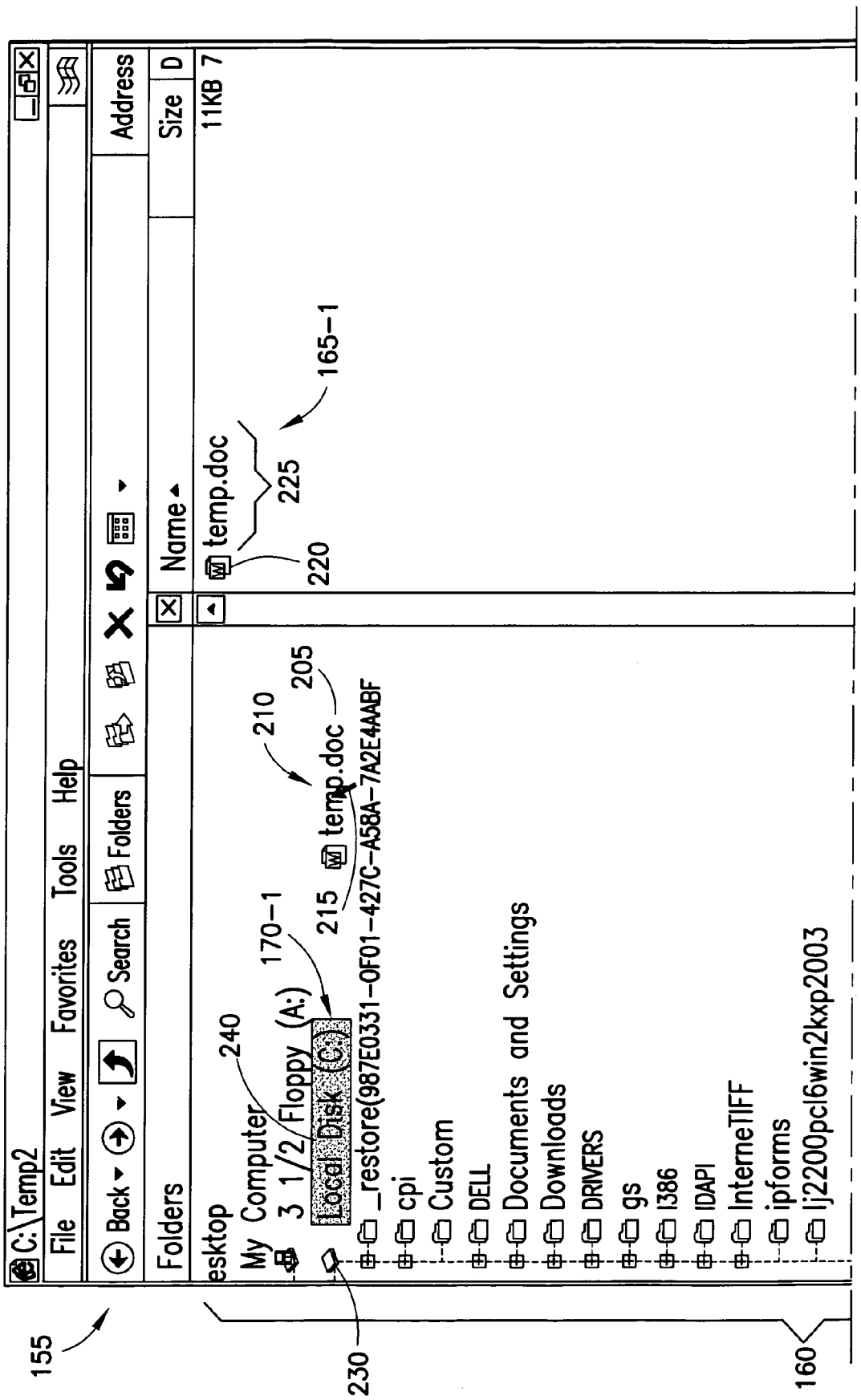
FIGS. 2-8 are illustrations of a window and operations taken by an exemplary process in response to a user performing drag and drop operations corresponding to a file.

As previously described, there are many occasions when a user desires to perform a file action (e.g., copy or move) with a file. For instance, very often a user wants to move or copy files, e.g., using a file manager, to a different location. In these instances, a user might notice in the middle of the operation that there actually is no appropriate folder for the file. Then she has to cancel the operation and create a new folder and start all over again. Although some operating systems allow a user to select a "create new folder" button when a file is being saved, this occurs only in certain interfaces and requires some amount of user interaction. The fact that the user has to create a new folder before she can move/copy anything to the new folder is a problem that has not been addressed.

To solve this problem, in an exemplary embodiment herein, a dynamic "New Folder" is activated when the user selects a file and starts performing a file action (such as moving or copying) corresponding to the file. The "New Folder" may be created first for a top level (e.g., parent level) of a directory structure, such as the root level, but the "New Folder" can be updated to lower levels (e.g., children levels) in the hierarchy according to user actions. In other words, no matter which level in the file manager the user chooses, there is in an exemplary embodiment a dynamic "New Folder". If the user drops the file to the "New Folder", the user may generally be prompted to give a name for the folder. However, if the user drops the file to some other folder than the "New Folder", the "New Folder" disappears.

Similarly to a "New Folder", a "Temp Folder" can be updated to follow user actions so that the level in which the user is working (e.g., having focus) has a "Temp Folder". Also, other kinds of target folders and also data files are possible. For example, these kinds of virtual targets can be created in a directory structure in response to user actions, and such virtual targets may be, e.g., folders, files, a reference to a folder or file. Furthermore, the file actions such as copy or move are a subset of item actions, and item actions can include additional actions such as copying information from a file into a template, creating a new file using an original file, or creating a reference to a item such as a file or folder.

In one embodiment, a virtual target is permanent if the virtual target is modified by the user. If the virtual target is, for example, a Temp folder, the Temp folder may be deleted when the computer is shut down (even though something would have been copied or moved there), but if the Temp folder is renamed, it is not deleted when the computer is shut down.

Turning now to FIG. 1, a block diagram is shown of an exemplary electronic device 100 suitable for use with embodiments of the disclosed invention and interacting with an external device. Electronic device 100 comprises one or more processors 105, one or more memories 110, one or more input devices 180, one or more displays 150, and one or more network interfaces (I/F) 175, each of which is interconnected through one or more buses 106. The one or more memories 110 comprise an operating system 115 and data storage 130. The operating system 115 includes a dynamic new folder process 120. The data storage 130 includes a directory structure 135, which includes files 140 and folders 145. The files 140 and folders 145 are items 141. Items 141 can include other information, such as references to files 140. The one or more displays 150 include one or more windows 155 and one or more directory structure representations 135. Each directory structure representation 160 is a representation of some portion of the directory structure 135. The directory structure representations 160 include file icon(s) 165 and folder icon(s) 170. Each file icon 165 corresponds to a file 140, and each folder icon 170 corresponds to a folder 145. The external device could be, as non-limiting examples, an MP3 player, a cellular phone, a game console, or a computer system. The external device 180 includes a memory 185 having a directory structure 186, which has times 191 including files 190 and folders 195. The network interface 175 can be any type of interface such as a wireless network (e.g., Bluetooth or wireless local area network) or wired (e.g., Ethernet). It is noted that the window(s) 155, input device(s) 180, and dynamic new folder process 120 (as examples) enable a user interface to perform the functions described herein.

The operating system 115 could be any operating system supporting windows or text-based operating systems. In the example of FIG. 1, the dynamic new folder process 120 is part of the operating system 115, although other implementations are possible. It is also noted that the dynamic new folder process 120 can be fully incorporated into the operating system 115 such that the dynamic new folder process 120 might not be considered "separate" from the operating system 115 and one process with both the operating system 115 and the dynamic new folder process 120 is created. On the other hand, the dynamic new folder process 120 could be separate from the operation system 115, depending on implementation. The input devices 180 include, e.g., a mouse, a touch screen, a trackball, a keyboard, and a keypad, as non-limiting examples.

In general, the various embodiments of the electronic device 100 can include, but are not limited to, personal computers, workstations, cellular telephones, personal digital assistants (PDAs) with or without wireless communication capabilities, portable computers with or without wireless communication capabilities, image capture devices such as digital cameras having wireless communication capabilities, gaming devices with or without wireless communication capabilities, music storage and playback appliances, Internet appliances permitting wired or wireless Internet access and browsing, as well as portable units or terminals that incorporate combinations of such functions. It is noted that the electronic device 100 may include a computer-readable medium, e.g., as part of memory(ies) 110. The computer-readable medium tangibly embodies a program of computer-readable instructions executable by at least one processor to perform operations described herein.

The window 155 is displayed, e.g., by the operating system 115. A user interacts with the window 155 by using input device 180. When the user desires to perform a file action, such as a copy or move, with a file, the user will typically select a file icon 165 and perform a drag operation. However, there are also other ways to perform a file action. For example, the user may cause a file action to be performed by using a key combination and/or by moving focus with arrow keys in the file structure. Or, other kind of interaction methods such as voice control, eye tracking methods, and acceleration sensors, as non-limiting examples, can be used to signal or cause a file action. The user can interact with one or more folder icons 170, such as by placing focus on a folder icon 170. In an exemplary embodiment, when a user places focus on a folder icon 170 during a drag operation, the dynamic new folder process 120 will create a "new folder" (not shown in FIG. 1) in the directory structure representation 160. The new folder is created in child relationship with the folder icon, the parent folder icon, that has focus. It is noted that it might not be necessary for the user to place a focus on a folder icon, but the most probable target folder icon could be calculated or guessed by the system (e.g., the dynamic new folder process 120). In this way, the target folder can be updated to the correct level when the user starts the dragging operation. The user interaction with a file and subsequent new folder creation is better explained through reference to additional figures.

FIGS. 2-8 are illustrations of a window and operations taken by an exemplary process to a user performing drag and drop operations corresponding to a file. In FIG. 2, a window 155 includes a directory structure representation 160, which is a representation of a hierarchical arrangement 250 of folders 145 (e.g., and files 140) in directory structure 135. In the example of FIG. 2, two "levels" in the hierarchical structure are shown. There is a parent-child relationship between the local disc (C:) folder icon 170-1 and, e.g., the Custom folder icon 170-4 and Temp2 folder icon 170-22. The "parent" is at a higher level than the "child". Similar parent-child relationships exist between the (C:) folder 145 and the Custom folder 145 and Temp 2 folder 145 on the directory structure 135. FIG. 2 also shows two external devices 260 and 261, an MP3 player and a game console respectively, to which file actions may be performed.

The file icon 165-1 is shown in the process of being moved during a drag operation 210. The icon 165-1 includes a graphic 220 and associated text 225. The associated text 225 corresponds to a name ("temp.doc") of a file 140. The local disc (C:) folder icon 170-1 is in focus due to the drag operation 210. The local disk (C:) folder icon 170-1 includes a graphic 230 and associated text 240. The local disk (C:) folder icon 170-1 corresponds to the (C:) folder (i.e., the "root directory") of a partition of a hard drive in the hierarchical arrangement 250. The focus on the local disc (C:) folder icon 170-1 is indicated by the highlighting of the text 240. The drag operation 210 is indicated by the pointer 215 and a grayed icon 205 that corresponds to file icon 165-1. The "temp.doc" file 140 is located in the Temp2 folder 145, as indicated by the folder icon 170-22.

Figure 3A:
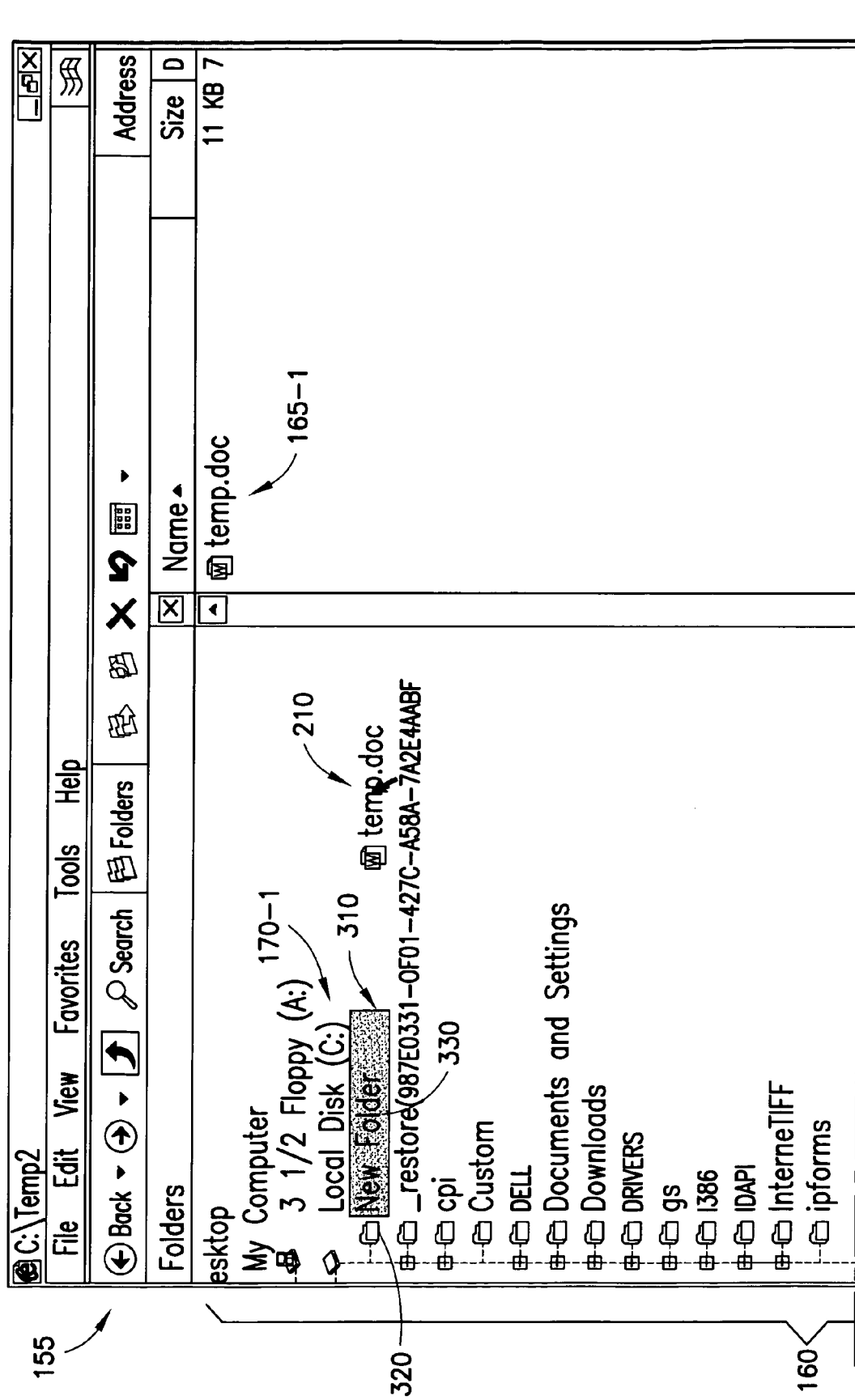

In response to the local disc (C:) folder icon 170-1 having focus that occurs during a drag operation 210, the dynamic new folder process 120 displays a New Folder icon 310 in the directory structure representation 160. This is shown in FIG. 3, where the New Folder icon 310 is shown at a location corresponding being in the folder 170-1. The New Folder icon 310 includes a graphic 320 and text 330 of "New Folder". In one embodiment, the "New Folder" is shown in the beginning of the list of folders and in another embodiment the "New Folder" is shown in the beginning of the list of folders and if the beginning of the list disappears from the view, then the "New Folder" is placed as the first folder in the updated list, so that the "New Folder" is again shown in the list of folders. The dynamic new folder process 120 has also moved the focus to the new folder icon 310. When the New Folder icon 310 is displayed, a corresponding new folder can be created, if desired, in the local disc (C:) folder 145 corresponding to the local disc (C:) folder icon 170-1. However, the disclosure below assumes that a new folder is created on the directory structure 135 in response to a drop operation being performed by a user. It is noted that recursive New Folders can also occur. For instance, if the user keeps the focus on New Folder 310 for a predetermined time period, another New Folder (not shown) can be placed in a level underneath the New Folder 310. If the user keeps the focus on the second New Folder for a predetermined time period, yet another New Folder (not shown) can be placed in a level underneath the second New Folder.

Figure 4A:
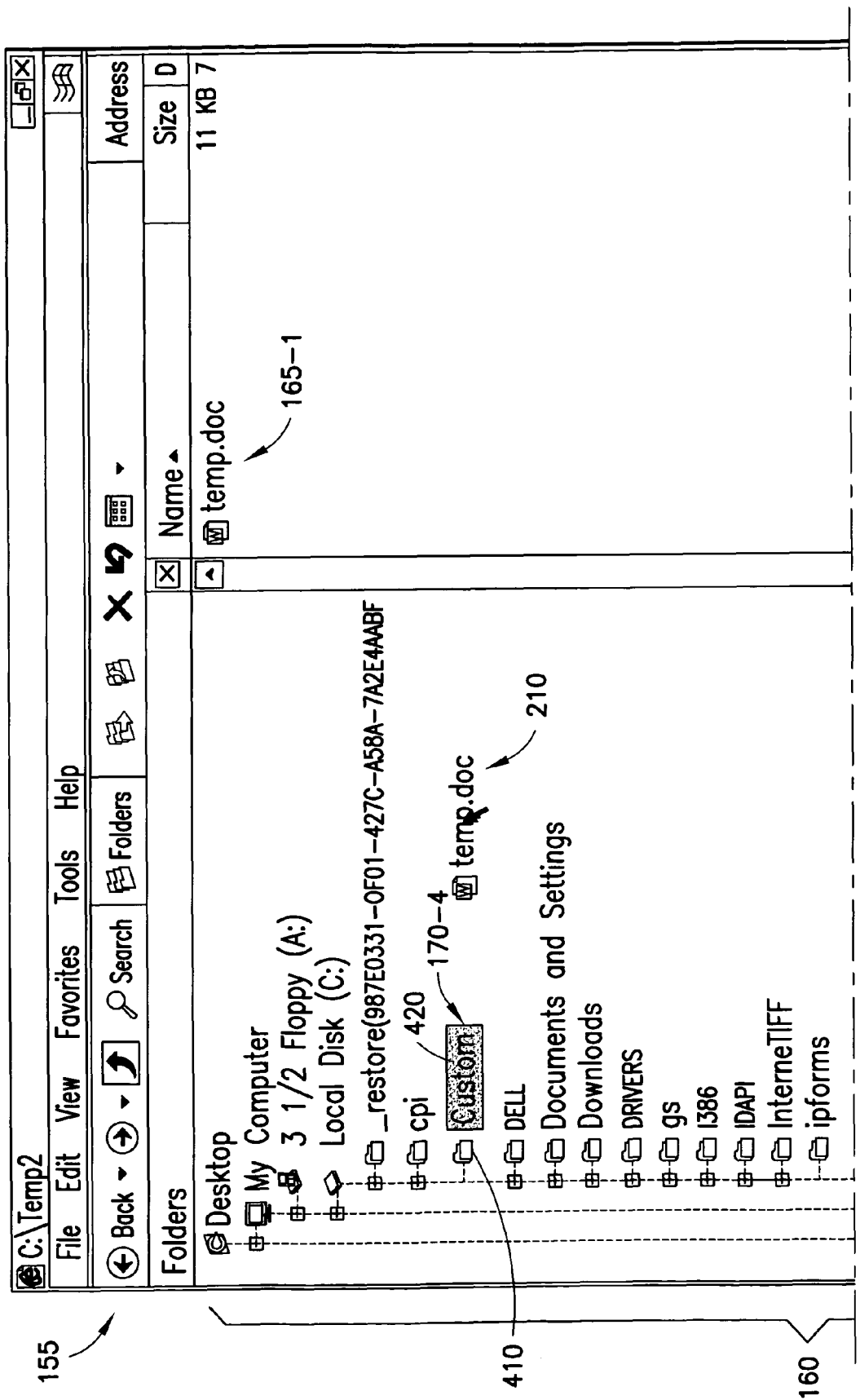
Figure 5A:
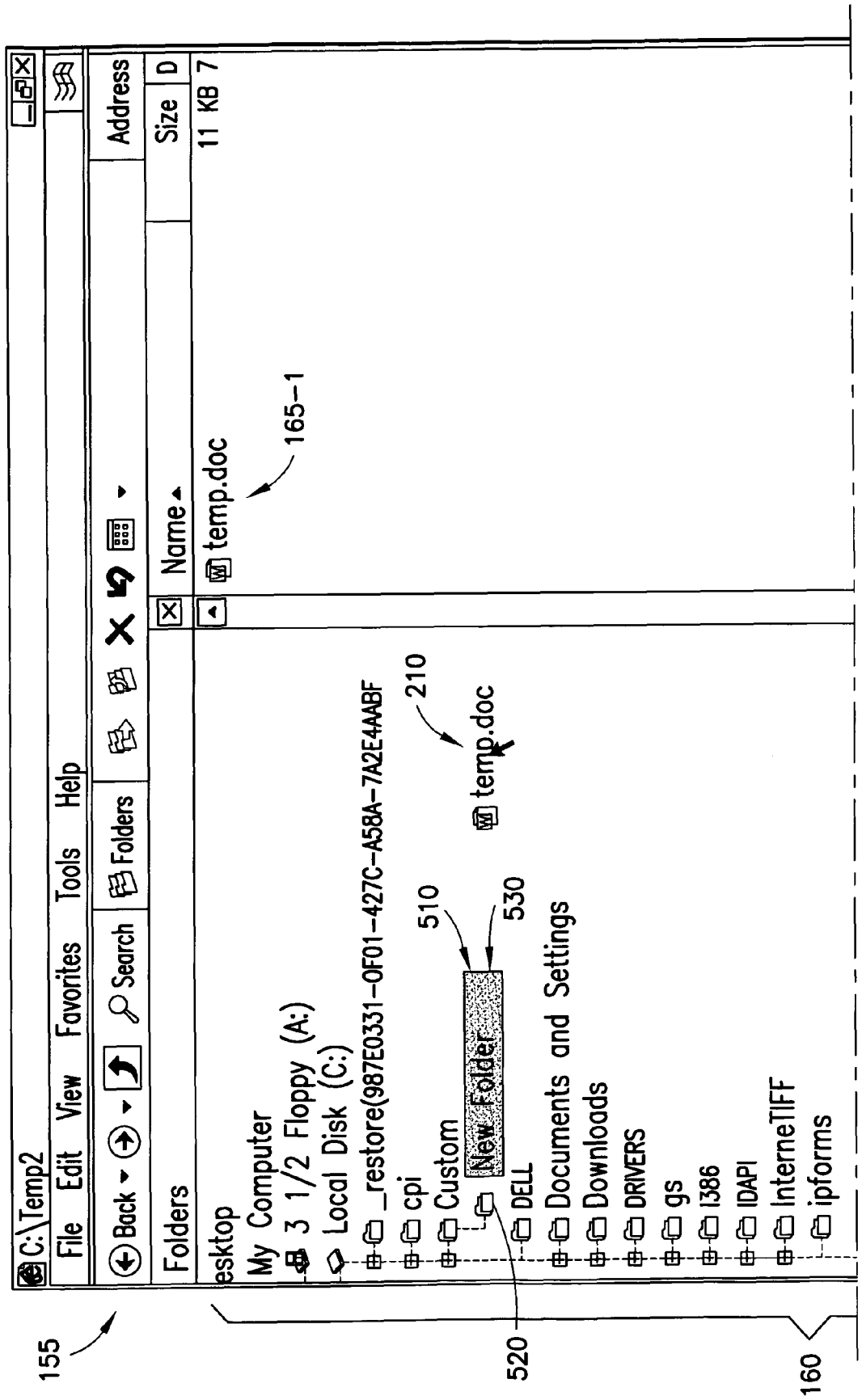

Assume the user desires to move the "temp.doc" file 140 to the "Custom" folder 145 and not to the (C:) folder 145. FIG. 4 illustrates this situation, where the user has moved the focus onto the Custom folder icon 170-4, which corresponds to the "Custom" folder 145. The Custom folder icon 170-4 includes a graphic 410 and text 420 of "Custom". The dynamic new folder process 120 has deleted the New Folder icon 310. In response to focus being placed on the Custom folder icon 140 during the drag operation 210, the dynamic new folder process 120 creates a New Folder icon 510, as shown in FIG. 5, at a location in the hierarchical arrangement 250 indicating that a folder corresponding to the New Folder icon 510 is in the Custom folder 145 corresponding to the Custom folder icon 170-4. The New Folder icon 510 includes a graphic 520 and corresponding text 530 (of "New Folder").

Figure 6A:
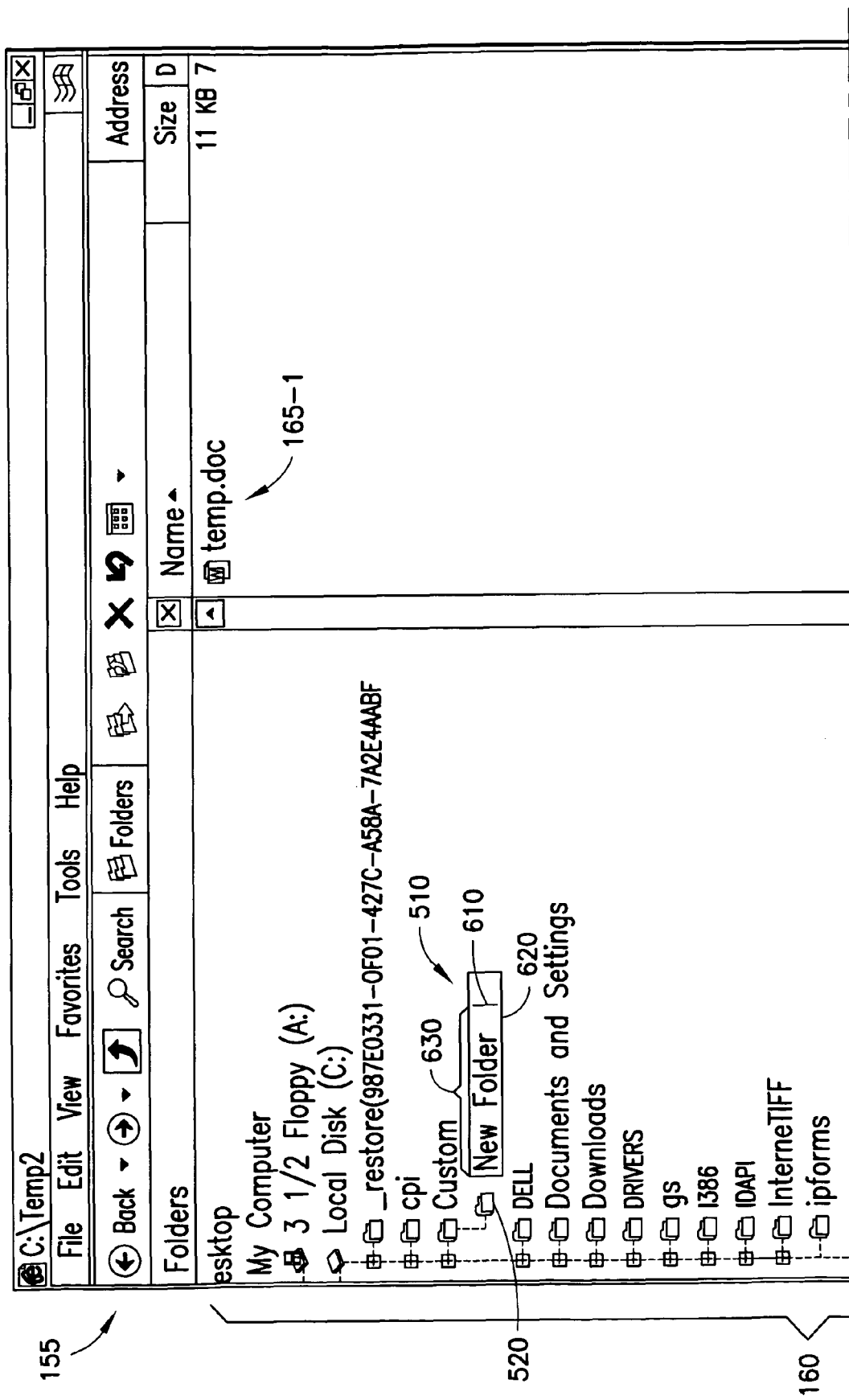

If the user performs a drop operation, which may include, e.g., a release of a mouse button during a drag operation while the New Folder icon 510 has focus, the dynamic new folder process 120 allows the user to modify the name of the New Folder icon 510, as shown in FIG. 6. The New Folder icon 510 is modified to include a text box 620 into which text 630 (of "New Folder") has been placed along with a cursor 610. By moving the cursor 610, the user can modify the text 630 into a chosen name for the file 140 corresponding to the icon 510. In one embodiment, a name for the New Folder icon 510 is suggested to the user. For example, the name may be suggested based on the file name, the contents of the file, date and/or time, based on the names of other already existing folders (e.g., if there are parallel folders named "1", "2", and "3", "4" could be suggested.), based on user actions (e.g., "moved from Temp2"), or it may be determined by the dynamic new folder process 120. Furthermore, in response to a drop operation, the dynamic new folder process 120 creates a folder 145 with the name New Folder in the directory structure 135 at a location in the Custom folder 145. It is noted that there may also be different kinds of functionalities associated to the folder. For example, in one embodiment, the file is directly executed (e.g., if the file is executable) or if the folder is of a compressed type (such as a "zipped" file), the moved/copied file can be compressed to an individual compressed file or as a part of a bigger compressed file containing other files. In one embodiment, the user can determine some default properties for the target folder.

Figure 7A:
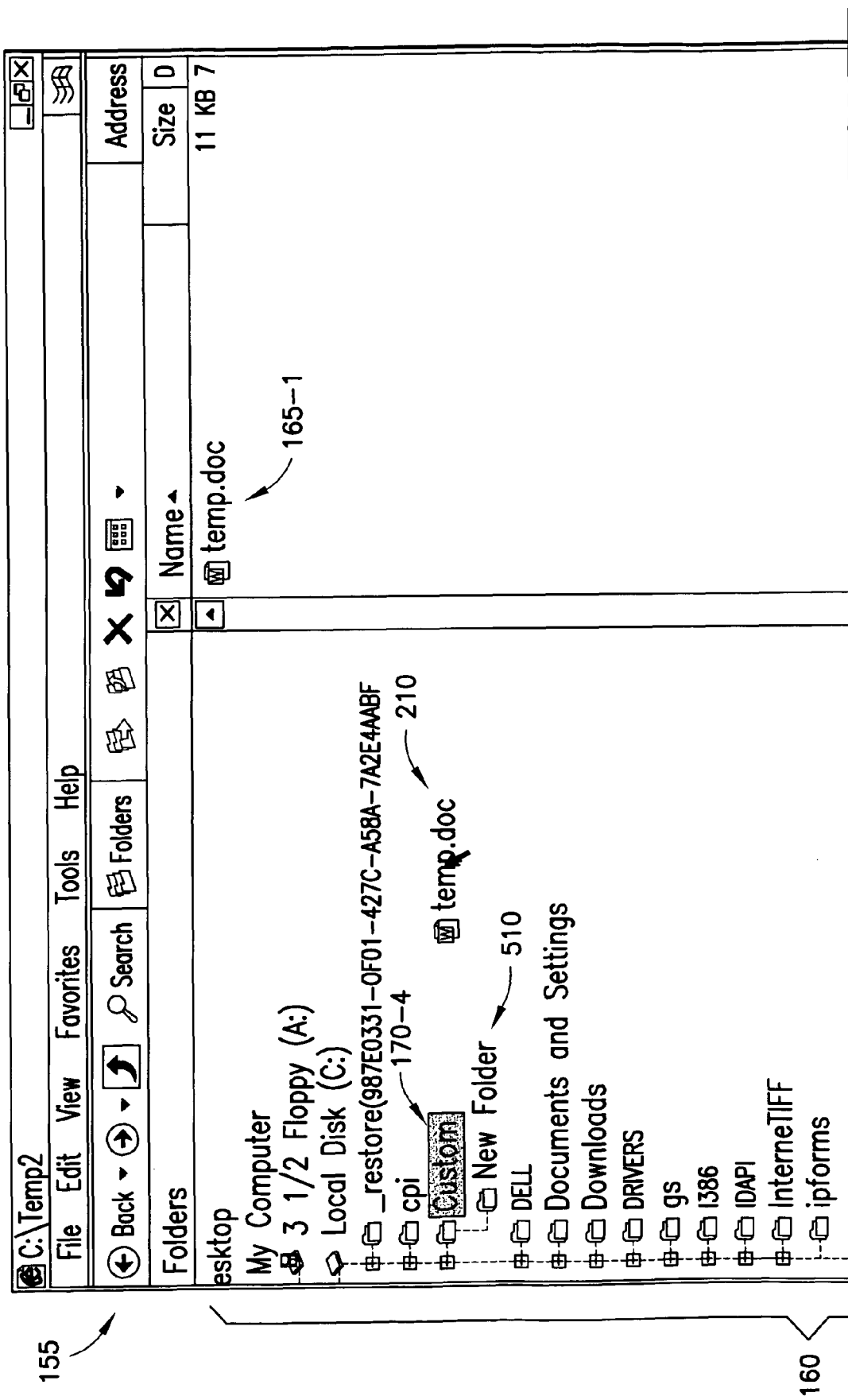
Figure 8A:
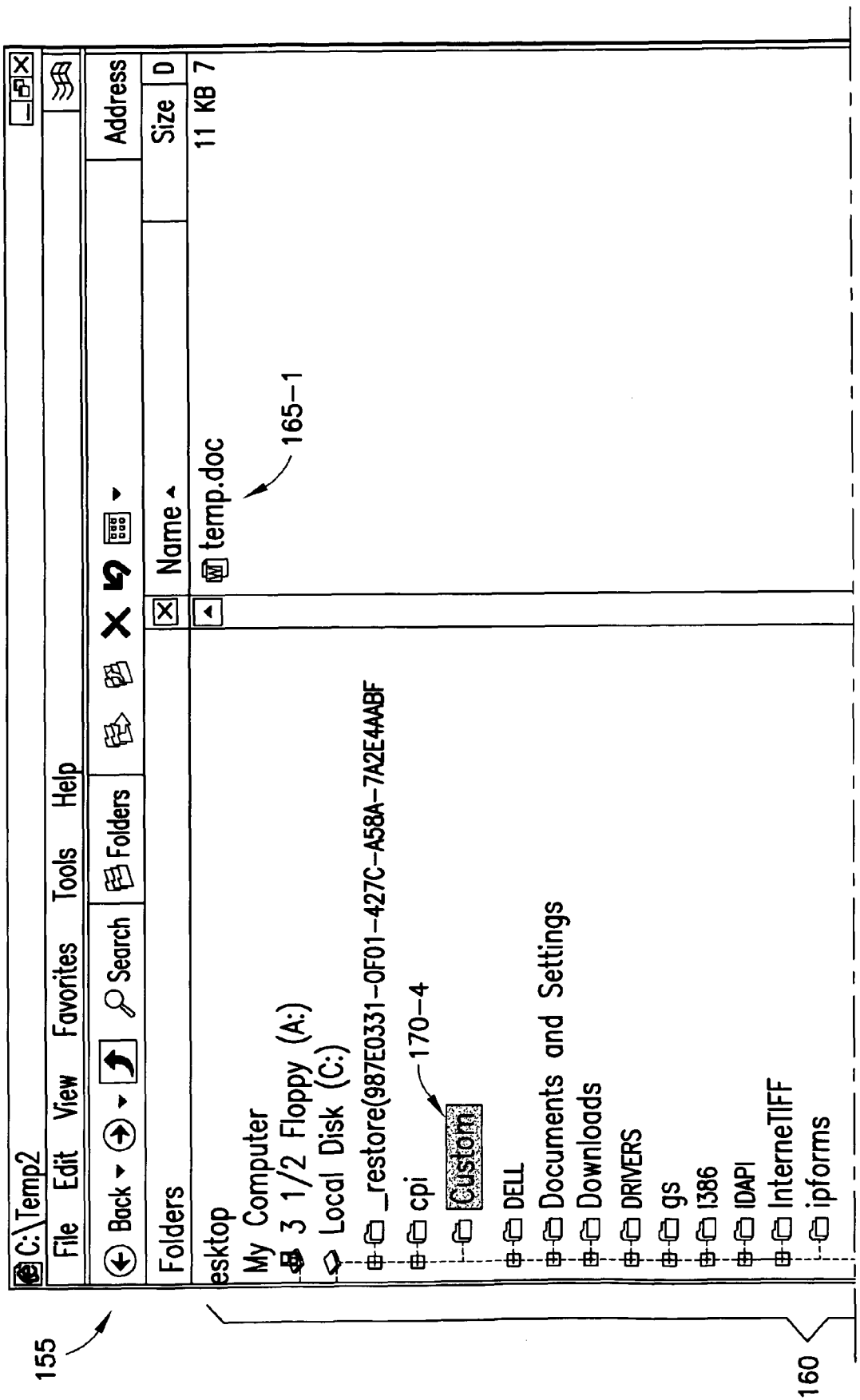

Assume the user decides not to move the "temp.doc" file 140 to a folder 145 corresponding to the New Folder icon 510 and instead decides to move the "temp.doc" file 140 to a folder 145 corresponding to the Custom icon 170-4. This is illustrated in FIG. 7. The user places focus on the Custom icon 170-4 and then performs a drop operation corresponding to the Custom icon 170-4. In response to the drop operation corresponding to the Custom icon 170-4, the dynamic new folder process 120 deletes the New Folder icon 510. This is shown in FIG. 8, where the "temp.doc" file 140 is shown as being in the Custom folder 145 because the Custom folder icon 170-4 is highlighted (e.g., has focus) and the file icon 165-1 is shown in the right pane as being in the Custom folder 145. It is noted that there may also be other criteria for causing the New Folder icon 510 to be deleted and the "temp.doc" file 140 moved to the Custom folder 145. In one embodiment, a timeout causes the New Folder icon 510 to be deleted and the "temp.doc" file 140 moved to the Custom folder 145. In another embodiment, cancelling the operation or starting a different operation may cause the New Folder icon 510 to be deleted.

Figure 9B:
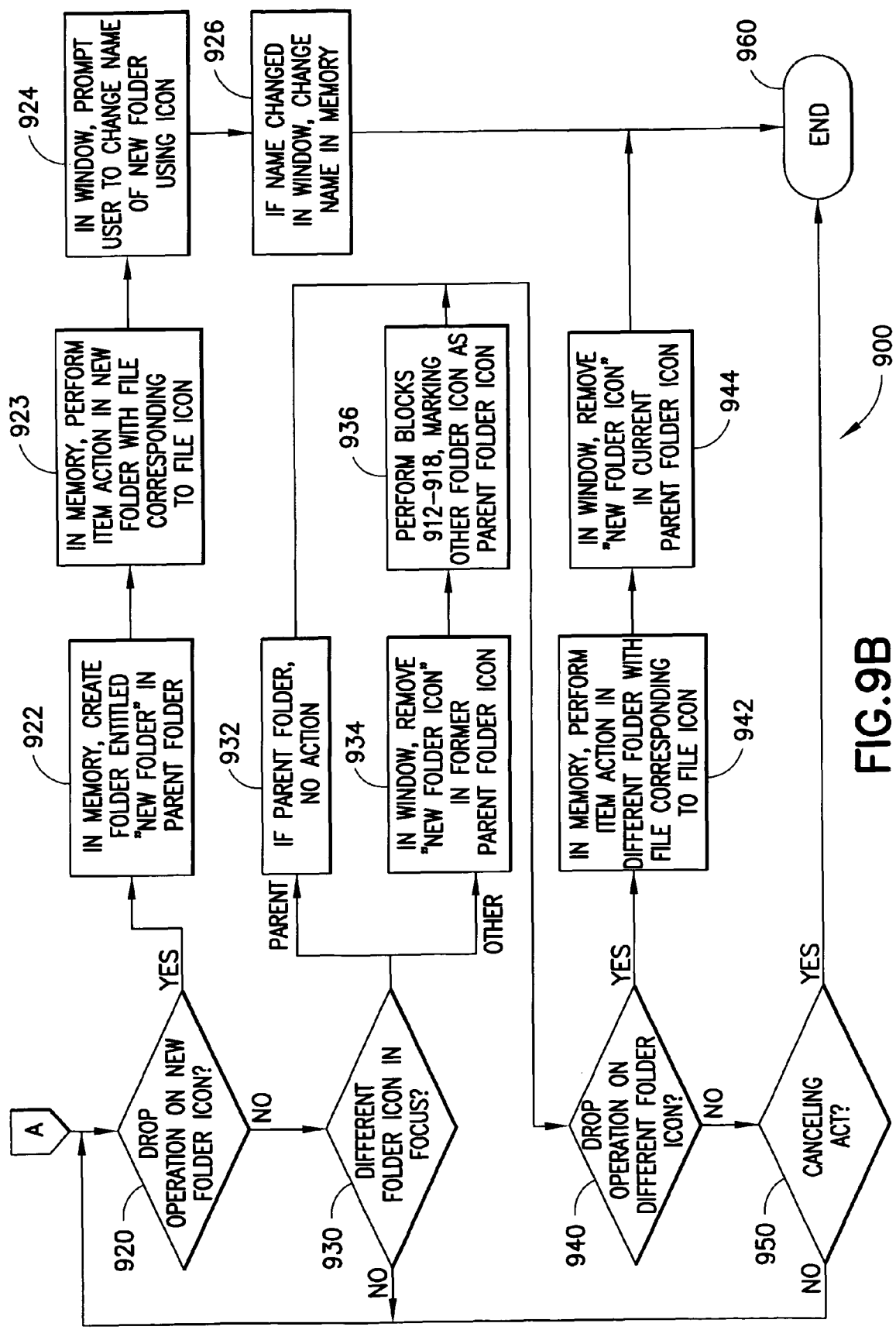

Referring now to FIGS. 9A and 9B, collectively. FIG. 9, with appropriate reference to preceding figures, FIGS. 9A and 9B are figures of a flowchart of an exemplary method 900 for creating dynamic new folders in response to user actions with a file. The method 900 would be performed by a combination of an operating system 115 and a dynamic new folder process 120 (e.g., as part of an, operating system 115). In an exemplary embodiment, blocks 922, 924, 926, 932, 934, 936, and 944 would be performed by the dynamic new folder process 120, while the operating system 115 would perform the other blocks of method 900. However, as indicated above, the operating system 115 and the dynamic new folder process 120 can be integrated into a single process that would perform all steps of method 900.

In block 905, a user performs a drag operation 210 using a file icon 165 in order to perform an item action such as copy or move in this example. If the drag operation 210 is not over an area with a directory structure representation 160 (block 907=No), the method 900 waits. If the drag operation 210 is over an area with a directory structure representation 160 (block 907=Yes), the method 900 determines if a folder is in focus (block 910). If a folder is not in focus (block 910=No), the method 900 waits. If a folder is in focus (block 910=Yes), the method 900 continues in block 912, where the folder is presented in a window if not already presented. In block 914, the folder is expanded, if not already expanded. In block 916, in the window, the new folder icon is created in the "parent" folder icon (e.g., the folder icon with the focus). In block 918, the focus is placed on the new folder icon.

If a drop operation is performed (block 920=Yes) "on" (e.g., corresponding to) the new folder icon, in memory, a folder 145 is created in the directory structure 135 entitled "New Folder" (for instance) in the parent folder 145, which corresponds to the parent folder icon 170 (block 922). A drop operation can be performed "on" the new folder icon when the new folder icon has focus and an action (such as releasing a mouse button) is performed to indicate a drop operation. In block 923, the item action (e.g., copy or move in this example) is performed in the new folder 145 using a file 140 corresponding to the file icon 165 used in the drag operation. For instance, in FIG. 6, the "temp.doc" file 140 was moved to a folder 145 entitled "New Folder" in a child relationship to the Custom folder 145. In block 924, the user is prompted to change the name of the New Folder. The prompt could be placing a cursor 610 in a text box 620 (see FIG. 6) or by using a popup window, as non-limiting examples. In block 926, if the name of the New Folder icon is changed in the window in which the New Folder icon is displayed, the name of the file 140 in the directory structure 135 is also changed.

In block 920, if there is no drop operation performed "on" the new folder icon (step 920=No), it is determined if a different folder icon is in focus (block 930). If the parent folder icon is in focus (block 930=parent), no action is taken in block 932. On the other hand, if another folder icon is in focus (block 930=other), in block 934, the new folder icon in the former parent folder icon is removed (e.g., deleted). In block 936, blocks 912-918 are performed, marking the other folder icon as the new parent folder icon. Method 900 continues after blocks 932 and 936 in block 940.

In block 940, it is determined if a drop operation has been performed on the different folder icon. If so (block 940=Yes), the item action (e.g., moving or copying in this example) is performed in block 942, and in the window the new folder icon is removed (e.g., deleted) from the current parent folder icon (block 944).

If there is some other canceling act (block 950=Yes), such as an escape key or performing the drag operation to another window, the method 900 ends in block 960. Otherwise (block 950=Yes), the method 900 continues in block 920.

Figure 10:
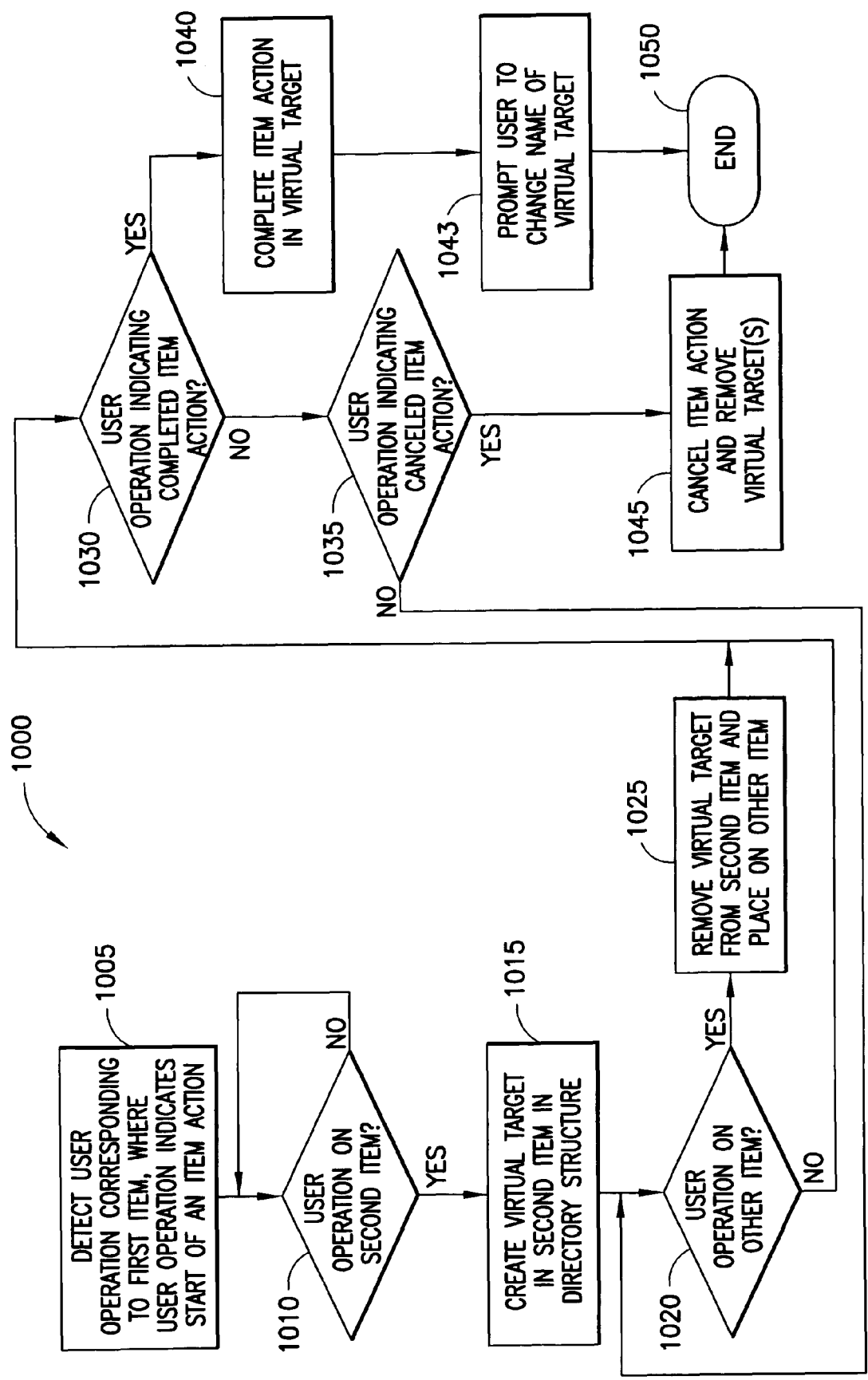
FIG. 10 is a flowchart of an exemplary method for creating virtual targets in response to user operations with items in directory structures.

The method of FIG. 9 dealt mainly with item actions from one folder to another folder. However, the disclosed invention in certain embodiments has broader applicability than just performing item actions from one folder to another folder. FIG. 10 shows a flowchart of a method 1000 illustrating broader applicability.

Method 1000 is performed in this example by the dynamic new folder process 120 only, but could be performed by a combination of the dynamic new folder process 120 and the operating system 115. In block 1005, a user operation is detected corresponding to a first item (such as a file or folder) in a directory structure. Such a user operation indicates the start of an item action, such as a copy of the first item, a move of the first item, creation of a new item using the first item, or creation of a reference (e.g., a link) to the first item. Typically, the item actions will be predefined to include actions allowed with the item. It is noted that the allowable item actions may depend on the item. For instance, an item action for a text file could include copying the text file to a letter template (as described in more detail below), whereas this item action might not be allowed when a folder is being copied.

The user operation could include a drag operation, as described above. However, the user operation could also include, for instance, highlighting the item, using a combination of keystrokes (such as control-C or any other keystroke (s)), placing focus on the item, moving the item using techniques other than dragging (e.g., by use of shortcut keys that perform a/the desired action(s)), or selecting the item. Thus, the user operation could also be used in text-based systems such as those on MP3 players as an example. It should be noted that the user operation could be performed, e.g., using text (e.g., such as a combination of keystrokes) corresponding to the item or using a window 155 and interacting with icons 165/170 corresponding to the item as shown above. The user operation on the first item indicates the start of an item action, and the user operation will depend on implementation.

In block 1010, it is determined if there is a user operation on a second item in the directory structure. Such a user operation on the second item could be selecting a level (e.g., by selecting a folder icon 170 in a directory structure representation 160) in a directory structure. The user operation on the second item could also include highlighting the second item, using a combination of keystrokes (such as control-C or any other keystroke(s)) to select the second item, placing focus on the item, or selecting the second item using techniques other than keystrokes. In block 1010, the user is determining where a virtual target (e.g., a target folder or a file) should be placed, and the user operation for the second item will depend on implementation.

If there is no user operation on a second item (block 1010=No), the method 1000 continues to wait. If there is a user operation on the second item (block 1010=Yes), a virtual target is created in the second item in the directory structure (block 1015). The virtual target will typically include a new folder as described above. However, the virtual target could be or include a compressed file into which the item is to be placed. The virtual target could also be or include some type of data file. In one embodiment, a template for a business letter or other data file is virtually created when the user performs the user operation indicating an item action with a text file. If the user selects the template, the text inside the text file is added to the template and also a name for the new document may be asked/suggested. Since there may also be templates for other kinds of file types, for example, a spreadsheet file, it may be necessary to first determine the type of the file (e.g., item) in order to provide a virtual target of an appropriate type.

In block 1020, it is determined if a user operation is performed corresponding to another item in the directory structure, such as the user selecting another folder for example. If so (block 1020=Yes), the virtual target is removed from the second item and placed on the other item. If not (block 1020=No) and after block 1025, the method 1000 continues in block 1030.

In block 1030, it is determined if there is a user operation indicating a completed item action. The user operation indicating a completed item action includes, e.g., a drop operation as described above, a combination of keystrokes (e.g., control-V), a pause of a duration greater than a predetermined duration (which could be indicated by a change of e.g. the cursor icon), and a command indicating a completed item action. If there is an operation indicating a completed item action (block 1030=Yes), the item action is completed in the virtual target in block 1040. As non-limiting examples, a file or folder could be copied or moved to the virtual target; a compressed file or folder could be created and the first item inserted into the compressed file or folder; and a text file (e.g., as a first item) could be inserted into a template. In block 1043, the user is prompted to change a name of the virtual target. The method 1000 ends in block 1050.

If there is an operation indicating a completed item action (block 1030=No), it is determined if there is a user operation indicating a canceled item action in block 1035. Such a user operation could be a drag to a location not associated with any items in a directory structure or a combination of keystrokes (such as the escape key). If so (block 1035=Yes), the item action is canceled in block 1045 and the method 1000 ends in block 1050. Otherwise (block 1035=No), the method 1000 continues in block 1020. It is noted that method 1000 can be modified to create recursive virtual targets. For instance, a first virtual target could be created in block 1015. If the user performs a user operation corresponding to the first virtual target, such as maintaining focus on the first virtual target (e.g., or a representation thereof) for a predetermined period, then a second virtual target could be created in the first virtual target.

It is noted that although only one window 155 is shown in FIGS. 2-8, item actions such as copy and move can take place between two windows 155. It is also noted that the file involved in the item action can be any file and also could be a folder. It is also noted that files can be manipulated using text, such as using key combinations to indicate "copy" or "move".

The embodiments of this invention may be implemented by computer software executable by the processor(s) 105 or by hardware circuitry, or by a combination of software and hardware circuitry. Further in this regard it should be noted that the various blocks of the logic flow diagram of FIG. 9 may represent program blocks, or interconnected logic circuits, blocks and functions, or a combination of program blocks and logic circuits, blocks and functions for performing the specified tasks.

The memory(ies) 110 may be of any type suitable to the local technical environment and may be implemented using any suitable data storage technology, such as semiconductor-based memory devices, magnetic memory devices and systems, optical memory devices and systems, fixed memory and removable memory. The processor(s) 105 may be of any type suitable to the local technical environment, and may include one or more of general purpose computers, special purpose computers, microprocessors, digital signal processors (DSPs) and processors based on a multi-core processor architecture, as non-limiting examples.

Embodiments of the inventions and particularly the dynamic new folder process 120 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best techniques presently contemplated by the inventors for carrying out embodiments of the invention. It is also within the disclosed invention to select multiple files and perform item actions (e.g., move/copy) with the multiple items (files and/or folders) to one/multiple target folders. Multiple target folders could be created by date or file size, for example. For instance, the user could use a key combination to define that all the selected files should have their own virtual target or certain groups of files should have a common virtual target. The same idea applies for one file to many virtual targets. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method comprising:
   detecting a first user operation corresponding to a first item in a directory structure, the directory structure representing a hierarchical arrangement of a plurality of items, including the first item, in a memory, the first user operation indicating a start of an item action with the first item;
   in response to detecting a second user operation corresponding to a second item in the directory structure, creating and displaying a virtual target in the second item in the directory structure, wherein the virtual target is a possible location for completion of the item action with the first item; and
   in response to a third user operation indicating completion of the item action with the first item in the virtual target, completing the item action with the first item in the virtual target by creating a third item in association with the second item that replaces the virtual target,
   in response to the third user operation indicating completion of the item action with the first item in the second item and not the virtual target, completing the item action with the first item in the second item and removing the virtual target.

2. The method of claim 1, wherein the first user operation comprises at least one of selecting a representation of the first item, highlighting a representation of the first item, or placing focus on a representation of the first item, moving a representation of the first item, dragging a representation of the first item, or performing at least one keystroke using an input device.

3. The method of claim 1, wherein the second user operation comprises selecting a level in the directory structure, wherein the level corresponds to a folder in the directory structure.

4. The method of claim 1, wherein the virtual target includes a corresponding name and the name is updated according to at least one user action.

5. The method of claim 1, wherein:
   detecting a first user operation further comprises detecting the first user operation on multiple first items in the directory structure; and
   completing the item action further comprises completing the item action with the multiple items in the virtual target.

6. The method of claim 5, wherein:
   creating a virtual target in the second item further comprises creating, in response to detecting the second user operation corresponding to multiple second items in the directory structure, a virtual target in each of the second items.

7. The method of claim 1, wherein:
   creating a virtual target in the second item further comprises creating, in response to detecting the second user operation corresponding to multiple second items in the directory structure, a virtual target in each of the second items.

8. The method of claim 1, wherein the item action comprises at least one of copying the first item, moving the first item, creation of a new item using the first item, creation of a reference to the first item, or creating a template and copying information from the first item into the template.

9. The method of claim 1, wherein the second user operation comprises at least one of selecting a level of the directory structure, highlighting a representation of the second item, using at least one keystroke to select the second item, placing focus on a representation of the second item, or selecting the second item.

10. The method of claim 1, wherein the third operation comprises at least one of drop operation performed using a representation of the first item, at least one keystroke, a pause of a duration greater than a predetermined duration, and a command indicating a completed item action.

11. The method of claim 1, further comprising, in response to a fourth user operation corresponding to the third item in the directory structure, creating a second virtual target in the third item in the directory structure.

12. The method of claim 1, further comprising, in response to a fourth user operation indicating completion of the item action with the first item in the second item, causing the virtual target to disappear.

13. The method of claim 1, wherein:
   detecting a first user operation further comprises detecting the first user operation on a representation of the first item in a directory structure representation;
   creating a virtual target further comprises creating, in response to detecting the second user operation on a representation of the second item in the directory structure representation, a representation of the virtual target and associating the representation of the virtual target with the representation of the second item; and
   completing further comprises completing, in response to the third user operation indicating completion of the item action with the representation of the first item associated with the representation of the virtual target, the item action with the first item in the virtual target.

14. A computer-readable storage medium tangibly embodying a program of computer-readable instructions executable by at least one processor to perform operations comprising:
   detecting a first user operation corresponding to a first item in a directory structure on a display, the directory structure representing a hierarchical arrangement of a plurality of items, including the first item, in a memory, the first user operation indicating a start of an item action with the first item;
   in response to detecting a second user operation corresponding to a second item in the directory structure, creating and displaying a virtual target in the second item in the directory structure on the display, wherein the virtual target is a possible location for completion of the item action with the first item; and
   in response to a third user operation indicating completion of the item action with the first item in the virtual target, completing the item action with the first item in the virtual target by creating a third item in association with the second item that replaces the virtual target,
   in response to the third user operation indicating completion of the item action with the first item in the second item and not the virtual target, completing the item action with the first item in the second item and removing the virtual target.

15. The computer-readable storage medium of claim 14, wherein the first user operation comprises at least one of selecting a representation of the first item, highlighting a representation of the first item, placing focus on a representation of the first item, moving a representation of the first item, dragging a representation of the first item, or performing at least one keystroke using an input device.

16. The computer-readable storage medium of claim 14, wherein the second user operation comprises selecting a level in the directory structure.

17. The computer-readable storage medium of claim 14, wherein the virtual target comprises one of a folder or a data file.

18. The computer-readable storage medium of claim 14, wherein the item action comprises at least one of copying the first item, moving the first item, creation of a new item using the first item, creation of a reference to the first item, or creating a template and copying information from the first item into the template.

19. The computer-readable storage medium of claim 14, wherein the second user operation comprises at least one of selecting a level of the directory structure, highlighting a representation of the second item, using at least one keystroke to select the second item, placing focus on a representation of the second item, or selecting the second item.

20. The computer-readable storage medium of claim 14, wherein the third operation comprises at least one of drop operation performed using a representation of the first item, at least one keystroke, a pause of a duration greater than a predetermined duration, and a command indicating a completed item action.

21. An apparatus comprising:
   at least one processor; and at least one memory including computer code, where the at least one memory including computer code, along with the at least one processor, are configured to:

store a directory structure comprising a hierarchical arrangement of a plurality of items;

detect a first user operation that corresponds to a first of the plurality of items, wherein the first user operation indicates a start of an item action with the first item;

in response to detecting a second user operation that corresponds to a second item of the plurality of items, create and display a virtual target in the second item of the plurality of items in the directory structure, wherein the virtual target is a possible location for completion of the item action with the first item; and in response to a third user operation that indicates completion of the item action with the first item in the virtual target, complete the item action with the first item in the virtual target by creating a third item in association with the second item that replaces the virtual target, in response to the third user operation indicating completion of the item action with the first item in the second item and not the virtual target, complete the item action with the first item in the second item and remove the virtual target.

22. The apparatus of claim 21, wherein the first user operation comprises at least one of selecting a representation of the first item, highlighting a representation of the first item, placing focus on a representation of the first item, moving a representation of the first item, dragging a representation of the first item, or performing at least one keystroke using an input device.

23. The apparatus of claim 21, wherein the second user operation comprises selecting a level in the directory structure.

24. The apparatus of claim 21, wherein the virtual target comprises one of a folder or a data file.

25. The apparatus of claim 21, wherein the item action comprises at least one of copying the first item, moving the first item, creation of a new item using the first item, creation of a reference to the first item, or creating a template and copying information from the first item into the template.

26. The apparatus of claim 21, wherein the second user operation comprises at least one of selecting a level of the directory structure, highlighting a representation of the second item, using at least one keystroke to select the second item, placing focus on a representation of the second item, or selecting the second item.

27. The apparatus of claim 21, wherein the third operation comprises at least one of a drop operation performed using a representation of the first item, at least one keystroke, a pause of a duration greater than a predetermined duration, and a command indicating a completed item action.

28. The apparatus of claim 21, wherein the apparatus comprises the memory.

29. The apparatus of claim 21, wherein the apparatus further comprises a network interface and the processor is coupled to the memory through the network interface.

30. The apparatus of claim 21, further comprising at least one input allowing the first, second, and third user operations and further comprising at least one display suitable to provide a representation of the directory structure.

31. A user interface comprising:

at least one display;

at least one input device configured to allow input of user operations; and a processor configured to:

communicate with the at least one display and the at least one input device;

detect a first user operation corresponding to a representation on the at least one display of a first item in a directory structure;

in response to detecting a second user operation corresponding to a representation on the at least one display of a second item in the directory structure, create and display on the at least one display a virtual target associated with the second item; and in response to a third user operation indicating completion of the item action with the first item in the virtual target, complete the item action with the first item in the virtual target by creating a third item in association the second item that replaces the virtual target in the directory structure, in response to the third user operation indicating completion of the item action with the first item in the second item and not the virtual target, complete the item action with the first item in the second item and remove the virtual target, wherein the directory structure represents a hierarchical arrangement of a plurality of items, including the first item, in a memory, the first user operation indicating a start of an item action with the first item, wherein the virtual target is a possible location for completion of the item action with the first item.

32. The computer-readable storage medium of claim 14, further comprising, in response to a fourth user operation indicating completion of the item action with the first item in the second item, causing the virtual target to disappear.

33. The method of claim 1, where creating a third item in association with the second item comprises creating the third item in a level underneath the second item in the directory structure.

34. The method of claim 33, where if the second user operation to the second item is detected as maintained for a predetermined period of time, creating a fourth item in a level underneath the third item in the directory structure.

35. The method of claim 1, where the third item becomes permanent if modified by a user.

36. The method of claim 1, where the third item is deleted upon power down.

37. The method of claim 1, wherein the second item comprises a folder and the virtual target comprises a folder distinct from the folder of the second item.

* * * * *